May 15, 1951 W. L. BARROW 2,552,511
INSTRUMENT LANDING SYSTEM
Filed Jan. 25, 1947 3 Sheets-Sheet 1
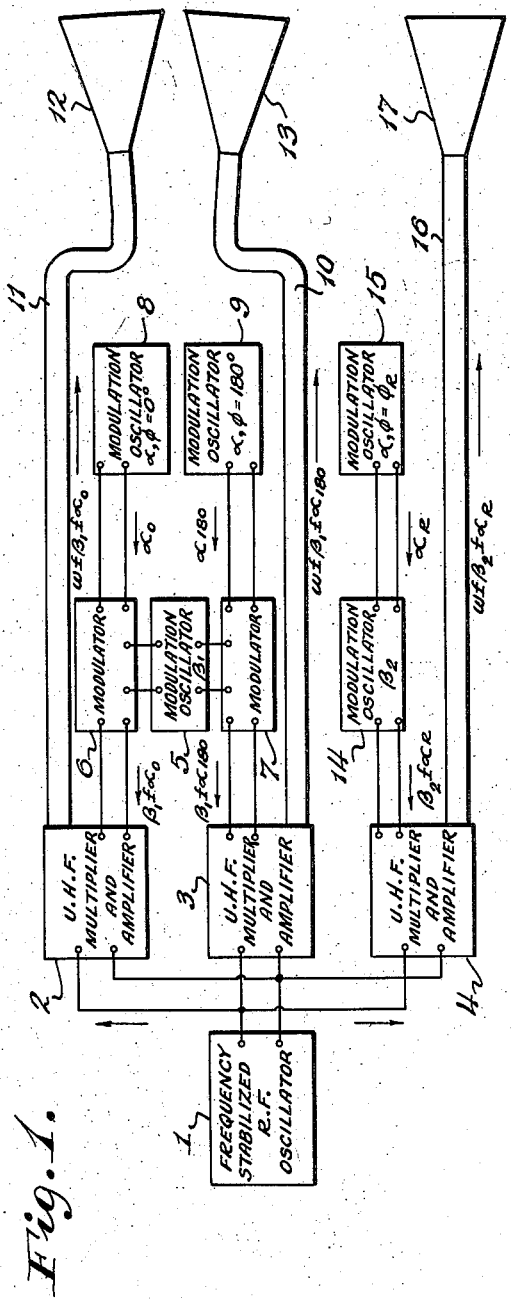
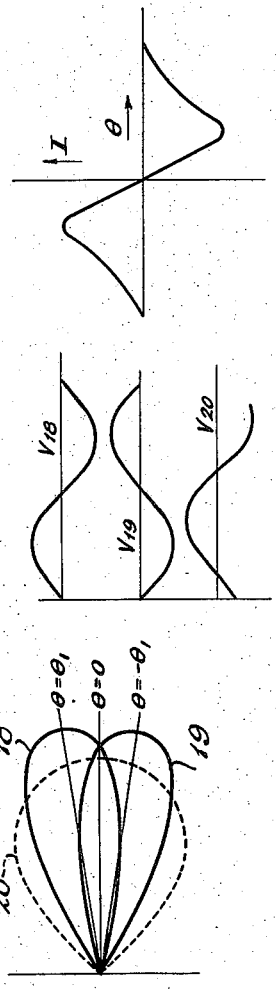
INVENTOR.
WILMER L. BARROW
BY
ATTORNEY May 15, 1951 W. L. BARROW 2,552,511
INSTRUMENT LANDING SYSTEM
Filed Jan. 25, 1947 3 Sheets-Sheet 3
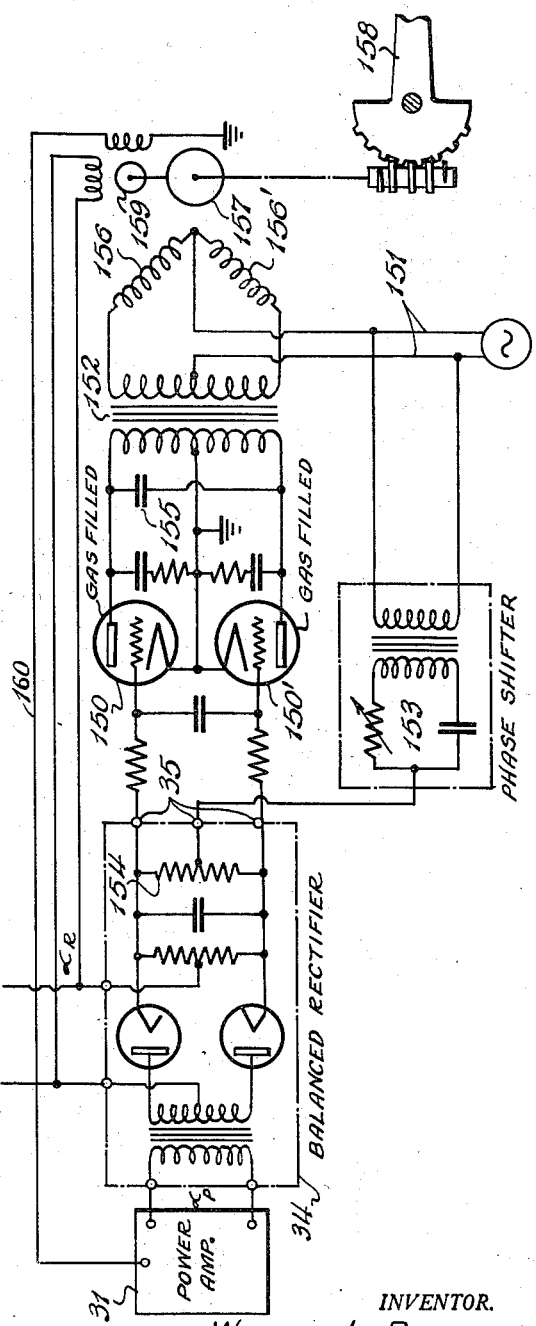
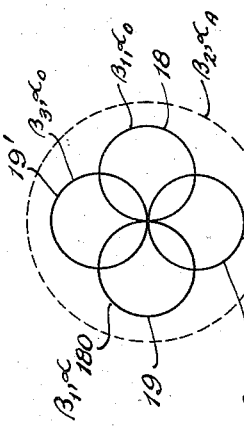
INVENTOR.
WILMER L. BARROW
BY
Paul B. Hunter
ATTORNEY

UNITED STATES PATENT OFFICE 2,552,511

INSTRUMENT LANDING SYSTEM

Wilmer L. Barrow, Manhasset, N. Y., assignor to The Sperry Corporation, a corporation of Delaware Original application October 23, 1941, Serial No. 416,160. Divided and this application January 25, 1947, Serial No. 724,389

6 Claims. (Cl. 318—18)

This invention relates, generally, to the blind or instrument landing of aircraft by radio means employing an overlapping beam type of instrument landing system in which the signal transmitted from the ground or other landing area and received at the aircraft by novel receiver means thereon is designed to provide in the craft suitable control voltages or currents such as an audio frequency voltage or current of reversing phase character. Such a signal is suitable for use in a servo-controlling means which controls the landing of the aircraft and in actuating indicating instruments useful as aids in landing aircraft.

In the overlapping-beam instrument landing systems of the prior art, two or more beams are transmitted to provide an equi-signal course along which the plane should fly in order, safely and properly, to carry out an instrument landing. In these prior art systems, it has been customary to modulate each of the two or more beams at distinct and different audio frequencies; for example, 90 and 150 cycles, etc., a second. Further characteristics of these prior-art systems include separation or filter circuits in the receiver that separate into distinct circuits the received signal from each of the two or more beams, and indicating devices that operate by virtue of the difference of intensity of the signals thus separated. It is also customary, in most of the prior art systems, alternately to transmit on one beam and then the other, in order to avoid effects of interference in space by the two beams of the same carrier frequency. This commutation of the carrier necessitates the use of more or less complicated equipment and in addition generally lowers the operating efficiency of the systems employing the same. Further, these prior art systems generally were not readily adaptable for automatic control of the aircraft.

The present application is a division of Patent No. 2,414,791 for Instrument Landing System, filed October 23, 1941 in the name of Wilmer L. Barrow.

An object of the invention is to provide a novel receiver for aircraft adapted for receiving radio beams and utilizing the same for establishing the degree of deviation of the craft from its true course in any desired plane or planes, said receiver producing a variable magnitude, reversible phase signal suitable for control purposes.

Another object of the invention is to provide means for utilizing the output of said receiver for controlling servo means effecting automatic control of the craft.

Another object of the present invention is to provide in a beam type of instrument landing system of the above character wherein the ultra high frequency transmitter means employs an audio frequency or servo-signal modulation superimposed on a radio frequency modulation to make possible a separate reception of the indicating or servo-signal from the reference signal, which has the same audio frequency and must be transmitted independently on the craft to provide the necessary phase reference required by said novel indicating or servo-signal electrically controlled equipment, said reference signal modulation being superimposed on a different radio frequency modulation from the servo-signal, thus providing distinct channels which may be filtered in the receiver means and independently demodulated.

Another object of the invention is to provide a novel high frequency receiver adapted to receive carrier signals containing reference and signal side bands, together with means for comparing said reference signal and side bands as to phase, and the servo mechanism controlled from said phase comparing means.

The invention also relates to the novel features or principles of the instrumentalities described herein, whether or not such are used for the stated objects, or in the stated fields or combinations.

Other objects and advantages will become apparent from the specification, taken in connection with the accompanying drawings wherein the invention is embodied in concrete form.

In the drawings,

Fig. 1 is a block diagram of a transmitter of this invention suitable for producing the desired beams in either azimuth or elevation.

Fig. 3 shows the plan view of the three beams required for control in any one coordinate.

Fig. 4 shows the character of the modulation applied to these three beams.

Fig. 5 shows the variation of the final direct current output of the receiver used in controlling the servo-system as a function of the angular deviation of the aircraft from the fixed flight path.

Fig. 6 shows a cross section of the five beams needed for control in both coordinates.

Figs. 7, 8 and 9 show vector relations from which Fig. 6 is derived.

Fig. 10 illustrates an electric servo device adapted for use in connection with the structure of Fig. 2.

Figure 2:
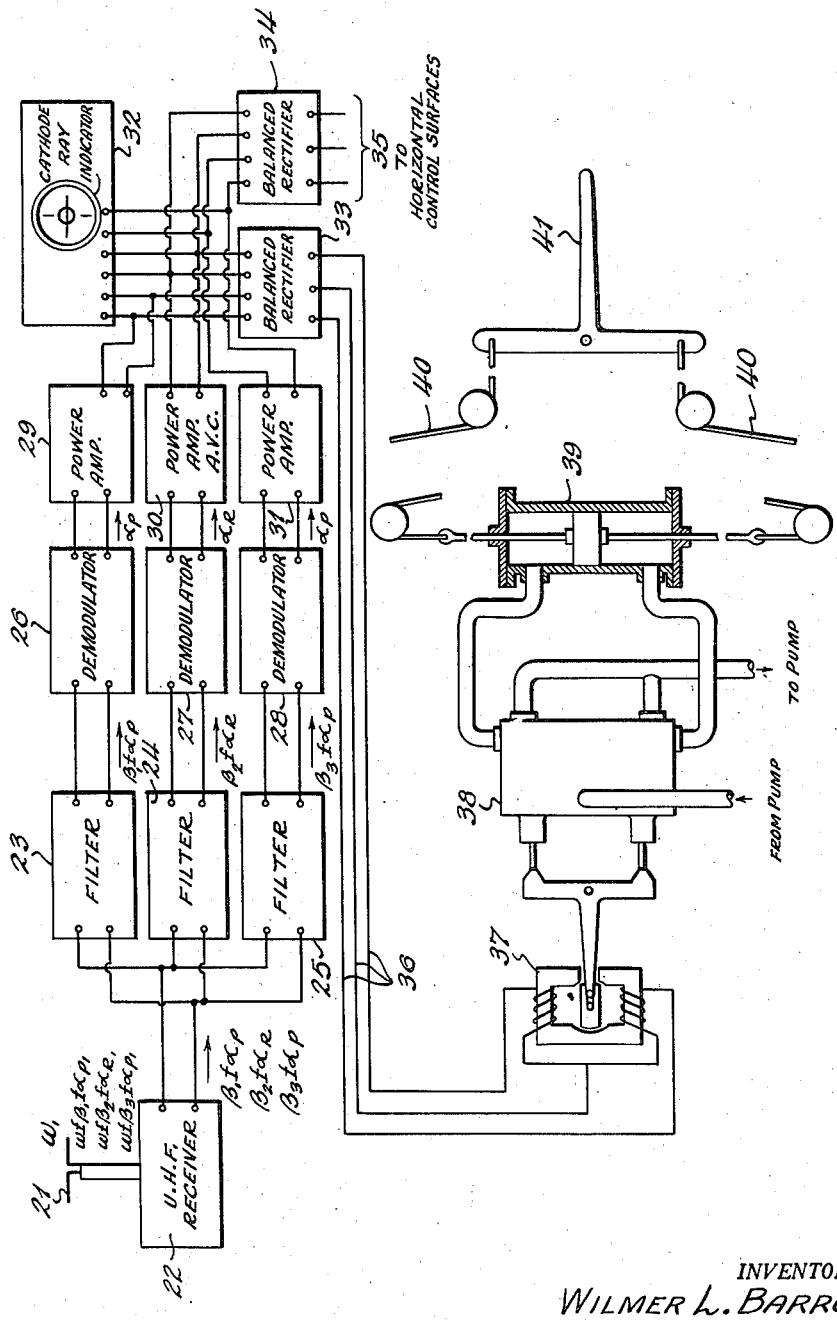
Fig. 2 is a diagram of a receiver suitable for changing right-left and/or up-down information, as received from two transmitting systems such as the one shown in Fig. 1, into servo signals for operation of the control surfaces of the aircraft by means of a conventional servo-system and/or for operation of indicating instruments.

Referring now to Fig. 1, a block or functional diagram is illustrated of the instrument landing system as pertains to one coordinate or plane. The transmitting source 1 is a frequency stabilized radio-frequency oscillator of conventional type, whose frequency, after multiplication by the ultra high frequency multiplier amplifiers 2, 3 or 4, becomes a frequency which is of the order of $3 \times 10^9$ cycles per second and which may be designated as $\omega$ and is useful in this invention because of the well known properties of such ultra high frequency. The output of a modulation oscillator 5, preferably of radio frequency is modulated by the output of a lower frequency oscillator 8 and the resultant modulation products are used to modulate the carrier frequency of device 2. Thus, for example, the frequency $\omega$ emitted by multiplier amplifiers 2 and 3 may be modulated by a frequency $\beta_1$ (of the order of, say 300 kilocycles), $\pm$ another frequency $\alpha$ (of the order of, say 60 cycles). The modulation $\alpha$ applied from oscillator 8 has $\phi = 0°$, where $\phi$ is the phase; this signal, combined with $\beta_1$ in modulator 6 is referred to as $\beta_1 \pm \alpha_0$. The useful side bands supplied by multiplier 2 are then $\omega \pm \beta_1 \pm \alpha_0$. The modulation $\alpha$ applied from oscillator 9 has $\phi = 180°$; this signal, combined with $\beta_1$ in modulator 7 is referred to as $\beta_1 \pm \alpha_{180}$. The useful side bands emitted by multiplier 3 are then $\omega \pm \beta_1 \pm \alpha_{180}$.

The frequency $\omega$ emitted by multiplier amplifier 4 is modulated by a frequency $\beta_2$ (of the order of, say 100 kilocycles), $\pm$ the $\alpha$ frequency. The modulation $\alpha$ applied from oscillator 15 has $\phi = \phi_R$ which may have any fixed phase relation to the outputs of oscillators 8 and 9; this signal, combined with $\beta_2$ in modulator oscillator 14 is referred to as $\beta_2 \pm \alpha_R$. The doubly modulated carrier emitted by multiplier 4 is then $\omega \pm \beta_2 \pm \alpha_R$.

The three signal channels, $\omega \pm \beta_1 \pm \alpha_0$, $\omega \pm \beta_1 \alpha_{180}$, and $\omega \pm \beta_2 \pm \alpha_R$ are fed through wave guides 11, 10 and 16, to directive electromagnetic radiators 12, 13 and 17, respectively. These radiators are shown as horns but may be any of the well known types of directive radiators. The radiators 12 and 13 are so orientated relative to each other that the characteristic overlapping-beam radiation pattern consisting of beams 18 and 19 (see Fig. 3) is produced, whereas radiator 17 produces a wide beam 20 encompassing both beams 18 and 19. These beams are transmitted continuously, and the lower frequency $\alpha$ of modulation of the three beams is the same. The phase of the three modulations is such that when the envelope of one beam has its maximum, that of the second preferably has its minimum, while the envelope of the third or reference beam, whose phase is the reference, may be similar to one of the above or at an intermediate value.

Two distinct pairs of overlapping beams 18, 19 and 18', 19' (see Fig. 6) are employed for aircraft landing guidance as follows: one pair 18', 19' displaced angularly from each other in a vertical plane intersect along an inclined line producing the desired flight path to give altitude or glide path information to the craft; and the other pair 18, 19 displaced angularly from each other in a transverse plane, also intersect along said inclined line to give lateral or runway localizer information to the craft. These two sets of beams together provide continuous indication of the relative position of the plane with respect to the reference landing path in space that intersects the runway at its leading or approach edge.

Thus, two of the systems shown in Fig. 1 would be necessary for the complete system described above. A cross-section of the five beams necessary being shown in Fig. 6. The beams have the following frequencies:

| | | |
|---|---|---|
| Right-left: | $\omega \pm \beta_1 \pm \alpha_0$ | Beam 18 |
| | $\omega \pm \beta_1 \pm \alpha_{180}$ | Beam 19 |
| Up-down: | $\omega \pm \beta_3 \pm \alpha_0$ | Beam 19' |
| | $\omega \pm \beta_3 \pm \alpha_{180}$ | Beam 18' |
| Reference: | $\omega \pm \beta_2 \pm \alpha_R$ | Beam 20 |

Obviously, the same $\alpha_R$ signal can be used for both coordinates thus eliminating one reference beam channel.

Suppose we consider again the right-left signal generation system as shown in Fig. 1. If, for example, the radiators 12 and 13 are to supply this right-left signal, then Fig. 3 shows the horizontal patterns of the radiation fields, curve 18 indicating the pattern from radiator 12, curve 19, that from radiator 13, and curve 20, that from radiator 17.

According to the above description, antennas 12 and 13 transmit overlapping beams in which the indicating or servo-signal modulation $\alpha_0$; $\alpha_{180}$ is superimposed on the relatively high separation frequency modulation of frequency $\beta_1$ from modulator 5. The purpose of the modulation oscillator 5 is to make possible a separate reception of the servo-signal, i. e., the vector sum of $\alpha_0$ and $\alpha_{180}$ which may be designated as $\alpha_P$, of the overlapping beams 18 and 19 from the reference signal $\alpha_R$ of beam 20, which has the same frequency as the servo-signal and which must be transmitted to the craft also. In the functional diagram shown in Fig. 1, the separate transmission of the servo and reference signals is provided by means of the two distinct double modulations of frequencies $\beta_1$ and $\beta_2$. Appropriate equipment, to be described, in the receiver separates $\beta_1$ and its servo signal modulations from $\beta_2$ and its reference signal modulations.

Fig. 4 illustrates the relation of $\alpha$ modulating voltages of the outputs of antennas 12, 13 and 17, respectively; the upper diagram showing the phase of the $\alpha$ modulation on beam 18, the middle diagram, the $\alpha$ modulation of beam 19; this being of opposite phase; and the lowest diagram showing the phase of the reference modulation $\alpha$ on beam 20.

The operation of servo-signal electrically controlled equipment of this invention requires the use of the aforesaid servo voltage and the steady reference voltage of identical frequency. The reference voltage after reception by the aircraft is to be continuously supplied to servo apparatus of a balanced rectifier or similar type in order that the latter provide a direct current output whose amplitude and polarity vary with the magnitude and phase, respectively, of the resultant servo signal $\alpha_P$. The pattern 20, representing the reference beam is preferably made broad to supply said reference voltage at all positions of the craft in space at which the servo-signal may be received. Frequencies $\beta_1$ and $\beta_2$ are chosen to make modulation simple and to make easy the separation of servo and reference signals in the receiver, as determined by the details of the equipment employed and the state of the art.

Fig. 2 illustrates practical receiver equipment for this blind landing system. The energy received, contains the following frequencies, for a five beam system, i. e., $\omega, \omega \pm \beta_1 \pm a_P$, $$\omega \pm \beta_2 \pm a_R, \omega \pm \beta_3 \pm a_P$$

where we denoted $a_0$, $a_{180}$ by $a_P$, and is picked up by antenna 21, then amplified and demodulated by ultra high frequency receiver 22. The output of receiver 22 consists of $\beta_1 \pm a_P$, $\beta_2 \pm a_R$, and $\beta_3 \pm a_P$ resulting from the above-described modulation processes. The output of the receiver 22 is separated into three different circuits by means of the separation filters 23, 24 and 25. Filter 23 selects $\beta_1 \pm a_P$ and rejects all other signals. The second separation filter 24 passes $\beta_2 \pm a_R$. The third filter 25 passes signals of $\beta_3 \pm a_P$. The three filters are followed by demodulators 26, 27 and 28 whose output will contain currents of frequency $a$ only.

The outputs of the demodulators 26, 27 and 28 are amplified by means of power amplifiers 29, 30 and 31, respectively. A cathode ray indicator 32 of the type disclosed in Patent No. 2,262,033 of F. Moseley for Aircraft Flight Indicator and Control System Therefor and Patent No. 2,384,484 of E. Norden, F. Gemmill and E. Isbister for Aircraft Flight Indicator and System is shown connected to the outputs of the above amplifiers. A balanced rectifier 33 is supplied with $a_P$ by amplifier 29 and $a_R$ by amplifier 30. The varying direct current signal from 33 travels through leads 36 to operate a motor 37. The motor 37 actuates a conventional hydraulic servo system consisting of a sensitive valve 38, a power cylinder 39, and transmission cables 40 to control a vertical rudder surface 41. Another balanced rectifier 34 is supplied with $a_P$ and $a_R$ by amplifiers 31 and 30, respectively. The leads 35 from this rectifier 34 may be used to operate a similar servo system to turn the horizontal control surfaces of the craft.

If desired, instead of using a hydraulic servo system for operating the rudder 41 or elevator, as the case may be, the same may be operated by an electric servo system as shown in Fig. 10. In this system the balanced rectifier 34 is connected through the two outer leads 35 to the grids of grid controlled rectifier tubes 150 and 150'. A local alternating current supply 151 feeds a voltage through transformer 152 to the plates of tubes 150 and 150' in phase opposition, while this supply acts through a network 153, central lead 35, a divided resistor 154, and by way of the outer leads 35 to apply a phase shifted bias voltage to the grids of the tubes 150 and 150'. This bias voltage is displaced approximately 180° with respect to the alternating current plate voltage.

When the output signal $a_P$ is of one phase corresponding to the location of the craft in the lower lobe 18' of Fig. 6, for example, then this signal will put a positive voltage on the grid of, say, tube 150 at the same time that its plate swings positive. This causes tube 150 to conduct, thereby shorting the upper half of transformer 152, in effect, so that the lower half of this transformer is placed in parallel with a condenser 155. The presence of this condenser is reflected in the lower half of the secondary of transformer 152 as a large capacity having the effect of producing a substantially 90° leading current in the lower half of the secondary and in the connected winding 156' of a split phase induction motor 157, whose other winding 156, at this time, is supplied with current in phase with the supply 151. Thus the motor 157 operates in one direction to actuate control surface 158 in the proper manner to effect an upward movement of the craft toward the intersetcion of beams 18' and 19'.

If the craft were in beam 19', the lower tube 150' would be caused to pass current thus effecting rotation of the motor 157 in the reverse direction as will be apparent. The greater the magnitude of the signal voltage, the greater the resultant motor speed will be, so that the motor speed and hence the rate of movement of the craft back to the desired glide path is substantially proportional to its deviation from this path. In order to prevent hunting of the craft about the desired glide path, an anti-hunt circuit may be used employing a generator 159 driven by motor 157 and supplying a velocity voltage through a lead 160 to the input of power amplifier 31 in opposition to the signal voltage $a_P$.

The output of the demodulator 26 provides the servo voltage whose frequency is $a_P$ and whose phase is either 0° or 180° depending on which side of the true glide path the craft is located, and whose amplitude will vary with the right-left position in space of the receiving equipment. The amplitude will increase with the angular deviation from the equi-signal path for signals up to a certain value, after which it will gradually reduce to zero for continued deviation. The output of the demodulator 27 comprises the reference voltage of frequency $a_R$, of constant reference phase and substantially constant amplitude as provided by appropriate volume controls or by automatic volume control. The output of the demodulator 28 provides the servo voltage whose frequency is again $a_P$, whose phase is either 0° or 180°, and whose amplitude will vary with the up-down position in space of the receiver.

Consideration of the system as described above should make it appear that the demodulated output from demodulators 26 and 28 will have a zero value, both as to amplitude and phase, when the aircraft is disposed along the equi-signal path, indicated in Fig. 3 for one coordinate by $\theta=0$. When the receiving apparatus is at a position indicated in Fig. 3 by $\theta=\theta_1$, the strength of signal from beam 18 is greater than that of beam 19. Consequently, there will be an alternating current output from demodulator 26 whose phase is 0° and whose amplitude, over a relatively broad angular range, will be roughly proportional to the angle $\theta$. Similarly, when the receiving equipment is placed in the angular position $\theta=-\theta$ of Fig. 3, the signal received from beam 19 will predominate over that of beam 18; the output of demodulator 26 will then comprise an alternating current of 180° phase and of amplitude also roughly proportional to the angular deviation $-\theta$. Figs. 7, 8 and 9 indicate, by means of rotating vector diagrams, the three situations just described, wherein $v_P$ indicates the output voltage of demodulator 26.

As above described, two pairs of beams will be needed in a complete instrument landing system; one pair for the localizer and one pair for the glide path. Generally the transmitting equipment for these two functions are located at the opposite ends of the runway, although they may be located at the same place. It will, therefore, generally be necessary to have two complete sets of transmitting apparatus, and their carrier frequencies may or may not be the same. Thus, two complete sets of receiving equipment on the craft may be necessary, one of which if tuned to the localizer transmitter and the other to the glide-path transmitter. To make one of the receivers required for a two separate receiver system, the channel consisting of filter 25, demodulator 28, and power amplifier 31 would be omitted from the receiver of Fig. 2.

Inasmuch as a two coordinate system requires a minimum of three signal channels, only two modulations, for example, $\beta_2$ and $\beta_3$, are necessary to separate these channels at the receiver. In this case one channel will be in the form $\omega \pm \alpha_P$, so that filter 23 would pass $\alpha_P$, rejecting all other frequencies, and demodulator 26 would be eliminated. In general, if $n$ is the number of channels employed, the minimum number of $\beta$ modulations necessary is $(n-1)$.

Fig. 5 shows a diagram of the variation of the direct current output of the balanced rectifiers 33 and 34, as a measure of the angular deviation of the plane from its proper course. When on course, there is zero current a negative angular deviation causes an increase in the plus sense, and a positive angular deviation an increase in the negative sense of the current. Over a reasonable range the change in current is roughly proportional to the angular deviation. Such direct current characteristics are admirably suited to cathode ray or meter indication or to the operation of electrical machinery, hydraulic machinery through electro-hydraulic interconnections, and to combination with other signals or take-off currents in the craft.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In apparatus of the character described, a high frequency receiver adapted to receive initially modulated carrier signals that are further modulated with fixed phase reference and signal side bands, means for demodulating said carrier and separating said modulations in accordance with the frequency of said initial modulations, means for demodulating said initial modulation and means for comparing said resulting reference and signal side bands as to phase and a servo mechanism controlled from said phase comparing means.

2. In an aircraft having a control surface, servo mechanism for actuating said control surface, a receiver on said craft having means for detecting doubly modulated fixed phase signal and reference voltages, means for comparing said separated voltages as to phase, filter means for separating said signal and reference voltages according to frequency, and motor means connected to said phase comparing means to be controlled from the latter, said motor means being connected in driving relation to said servo mechanism for controlling this mechanism and hence determining the operation of said control surface.

3. Instrument landing receiving apparatus comprising a high frequency receiver adapted for receiving a common carrier having a plurality of side bands, certain of said side bands containing a separation modulation and a signal modulation, and another of said side bands containing a different frequency separation modulation and a reference modulation, said receiver serving to detect the side bands, filter means for separating the respective side bands in accordance with the frequencies of said separation modulations, demodulators for demodulating the side bands to produce signal and reference voltages, said signal voltages being of fixed phase relationship with respect to each other, amplifying means for separately amplifying the said voltages, and balanced rectifier means for comparing the signal voltages as to phase with said reference voltage.

4. In the apparatus of the character described, a receiver adapted to receive carrier signals having a plurality of side bands, one of said side bands containing a sub-carrier modulation, together with a signal modulation and another of said side bands containing a sub-carrier modulation and a reference modulation, said receiver having means for detecting said side bands together with filter means for separating the latter in accordance with the frequency of said sub-carrier modulations, means for demodulating said side bands to produce signal and reference voltages, balanced rectifier means for comparing versions of said signal and reference voltages, and a utility device operated in response to said balanced rectifier means.

5. In an aircraft position determining system, a receiver adapted to produce a plurality of output components of differing sub-carrier frequencies, said sub-carriers containing signal and reference modulations, filters for separating said sub-carriers according to frequency, means for demodulating said separated sub-carriers, means for comparing the signal and reference demodulated products as to phase, and a servo mechanism controlled from said last-named means for actuating the control surface of the aircraft.

6. In a craft radio position determining system for detecting the position of a craft in relation to directionally transmitted doubly modulated signals having signal components of opposite phase and a reference component of a phase fixed with respect to said signal components, radio receiving means for producing a plurality of output components of different sub-carrier frequencies with said signal components modulating a single sub-carrier and said reference component modulating a second sub-carrier, a plurality of sub-carrier filters for selecting separate desired ones of said sub-carriers and means for demodulating said selected sub-carrier components and providing phase comparison between the resultant of said combined signal components and said reference component.

WILMER L. BARROW.

REFERENCES CITED

The following references are of record in the file of this patent:

UNITED STATES PATENTS

| Number | Name | Date |
|---|---|---|
| 2,129,004 | Grieg | Sept. 6, 1938 |
| 2,183,725 | Seeley | Dec. 19, 1939 |
| 2,253,958 | Luck | Aug. 26, 1941 |
| 2,256,487 | Moseley et al. | Sept. 23, 1941 |